United States Patent
Smidth

(10) Patent No.: US 8,718,577 B1
(45) Date of Patent: May 6, 2014

(54) METHOD AND APPARATUS FOR MINIMIZING LOCAL OSCILLATOR LEAKAGE IN A TRANSMITTER

(71) Applicant: Exalt Communications Incorporated, Campbell, CA (US)

(72) Inventor: Peter Smidth, San Luis Obispo, CA (US)

(73) Assignee: Exalt Communications Incorporated, Campbell, CA (US)

( * ) Notice: Subject to any disclaimer, the term of this patent is extended or adjusted under 35 U.S.C. 154(b) by 0 days.

(21) Appl. No.: 13/689,402

(22) Filed: Nov. 29, 2012

(51) Int. Cl.
*H04B 1/04* (2006.01)

(52) U.S. Cl.
USPC ......... 455/114.2; 455/108; 455/118; 375/296

(58) Field of Classification Search
USPC ............... 455/84–86, 108–112, 114.1–114.3, 455/118, 119, 550.1; 375/296, 300, 302
See application file for complete search history.

(56) References Cited

U.S. PATENT DOCUMENTS

| | | | | |
|---|---|---|---|---|
| 7,376,200 | B2 * | 5/2008 | Demir et al. | 375/296 |
| 7,657,236 | B2 * | 2/2010 | Pan | 455/114.2 |

* cited by examiner

*Primary Examiner* — Nhan Le
(74) *Attorney, Agent, or Firm* — Hickman Palermo Truong Becker Bingham Wong LLP

(57) ABSTRACT

According to techniques described herein LO leakage may be automatically minimized in a transmitter chain, even though the leakage may be varying in nature. In an embodiment a target signal for transmission is received. An offset for reducing the effects of the LO leakage is applied to the target signal. After the offset is applied, the target signal is converted to a transmission signal using the LO. A power associated with the transmission signal is determined. The offset is then adjusted based on the power associated with the transmission signal. In another embodiment, the offset signal is adjusted in a manner that minimizes the power associated with the transmission signal.

18 Claims, 7 Drawing Sheets

Equations: (limit functions included)

402

$Oi(t) = \text{clip}(mi(t) + \text{clip}(Ka*\text{sigma}(mfi(t)*D(t)), Omax-mi(t), Omin+mi(t)), Omax, Omin)$
$Oq(t) = \text{clip}(mq(t) + \text{clip}(Ka*\text{sigma}(mfq(t)*D(t)), Omax-mq(t), Omin+mq(t)), Omax, Omin)$ where:

$mi(t) = G(t)*mfi(t)$ and
$mq(t) = G(t)*mfq(t)$ and
$D(t)$ = detector output and
$Ka$ = Desired $Oi(t)$ or $Oq(t)$ convergence rate
$Omax$ = desired maximum offset
$Omin$ = desired minimum offset
$\text{Clip}(a,b,c)$ where: a = value to clip, b = max value, c = minimum value Where:

$G(t) = \text{clip}(Kd*\text{sigma}(Ks-R(t), Gmax, Gmin)$ and
$mfi(t)$ and $mfq(t)$ are not correlated, examples are:
    a. $mfi(t)=\sin(w*t)$ and $mfq(t)=\cos(w*t)$
    b. $mfi(t)=+1, -1, 0, 0, 0$ and $mfq(t) = 0, 0, 0 +1, -1$
    c. Other orthogonal functions
$Kd$ = Desired convergence rate for $G(t)$ and
$Oi(t)$ equals I offset and
$Oq(t)$ equals Q offset Where:
$Gmin$= desired minimum modulation gain
$Gmax$= desired maximum modulation gain
$\text{Clip}(a,b,c)$ where: a = value to clip, b = max value, c = minimum value
$R(t) = (|Dni-Di|+|Dpi-Di|+|Dnq-Dq|+|Dpq-Dq|)/(Dmi+Dmq)$ and
$Ks$ = Desired set point for measurement modulation to signal ratio Where:
$Dni$ = detector value with negative dither on I input relative to nominal offset
$Dpi$ = detector value with positive dither on I input relative to nominal offset
$Dnq$ = detector value with negative dither on Q input relative to nominal offset
$Dpq$ = detector value with positive dither on Q input relative to nominal offset
$Di$= detector value with I input at nominal offset
$Dq$= detector value with Q input at nominal offset

Equations: (No limit functions included)

404

$Oi(t) = G(t)*\sin(w*t) + Ka*\text{clip}(\text{sigma}(mfi(t)*D(t), Cmin, Cmax))$
$Oq(t) = G(t)*\sin(w*t) + Ka*\text{clip}(\text{sigma}(mfq(t)*D(t), Cmin, Cmax))$ Where:
$G(t) = Kd*\text{sigma}(Ks-R(t))$ and
$mfi(t)$ and $mfq(t)$ are not correlated, examples same as above
$Kd$ = Desired convergence rate for $G(t)$ and
$Ka$ = Desired $Oi(t)$ or $Oq(t)$ convergence rate and
$D(t)$ detector output and
$Oi(t)$ equals I offset and
$Oq(t)$ equals Q offset Where:
$R(t) = (|Dni-Di|+|Dpi-Di|+|Dnq-Dq|+|Dpq-Dq|)/(Dmi+Dmq)$ and
$Ks$ = Desired set point for measurement modulation to signal ratio Where:
$Dni$ = detector value with negative dither on I input relative to nominal offset
$Dpi$ = detector value with positive dither on I input relative to nominal offset
$Dnq$ = detector value with negative dither on Q input relative to nominal offset
$Dpq$ = detector value with positive dither on Q input relative to nominal offset
$Di$= detector value with I input at nominal offset
$Dq$= detector value with Q input at nominal offset

FIG. 4

METHOD AND APPARATUS FOR MINIMIZING LOCAL OSCILLATOR LEAKAGE IN A TRANSMITTER

FIELD OF THE INVENTION

The present disclosure relates, generally, to transmitters for transmitting information by use of radio waves and, more specifically, to systems and methods for minimizing local oscillator leakage in transmitters.

BACKGROUND

A super heterodyne transmitter is a type of transmitter that uses an intermediate frequency (IF) in addition to a radio frequency (RF). Within the transmission chain of a super heterodyne transmitter, a mixer converts the IF signal to an RF signal by mixing the IF signal with a signal generated by the local oscillator (LO). In an ideal system, the IF signal and (LO) signal are mixed perfectly to generate an RF signal at the desired frequency range. However, in real-word applications, LO leakage causes unwanted additions to the RF signal. Making matters more complex, LO leakage normally varies over frequency, temperature, gain, and power level and can therefore not easily be calibrated out.

One approach for reducing leakage is to use a band stop filter to prevent the LO frequency component from reaching the transmitter power amplifier. This approach limits the frequency range that the transmitter can cover without changing filters and adds complexity to the system. It also prevents the transmitter chain from being modulated directly at baseband in applications where this is a requirement.

Another approach is to use a quadrature type upconverter to apply fixed DC offsets at complex baseband. The upconverter converts the fixed DC offsets into a cancellation vector, which is added to the baseband signal to cancel the noise introduced by the LO leakage. This approach is effective when there is little variability in LO leakage; however, it adds calibration complexity and hardware stability requirements, resulting in higher cost and lower performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which:

FIG. 4 is a chart illustrating example equation sets that are used for calculating and adjusting an offset signal during a process for minimizing LO leakage in a transmitter, according to an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

According to techniques described herein, LO leakage may be automatically minimized in a transmitter chain, even though the leakage may be varying in nature. In an embodiment a target signal for transmission is received. An offset signal for reducing the effects of the LO leakage is applied to the target signal. After the offset is applied, the target signal is converted to a transmission signal using the LO. A power associated with the transmission signal is determined. The offset signal is then adjusted based on the power associated with the transmission signal. In an embodiment, the offset signal is adjusted in a manner that minimizes the power associated with the transmission signal.

In an embodiment, adjusting the offset signal comprises varying the offset signal over time in accordance with a dither function and, in response to varying the offset signal over time, detecting that a particular variation reduces the power associated with the transmission signal. The offset signal is then adjusted based on the particular variation. In other embodiments, a dither amplitude and/or step size associated with the offset adjustment may be dynamically changed according to one or more criteria.

Transmitter System Architecture

Figure 1:
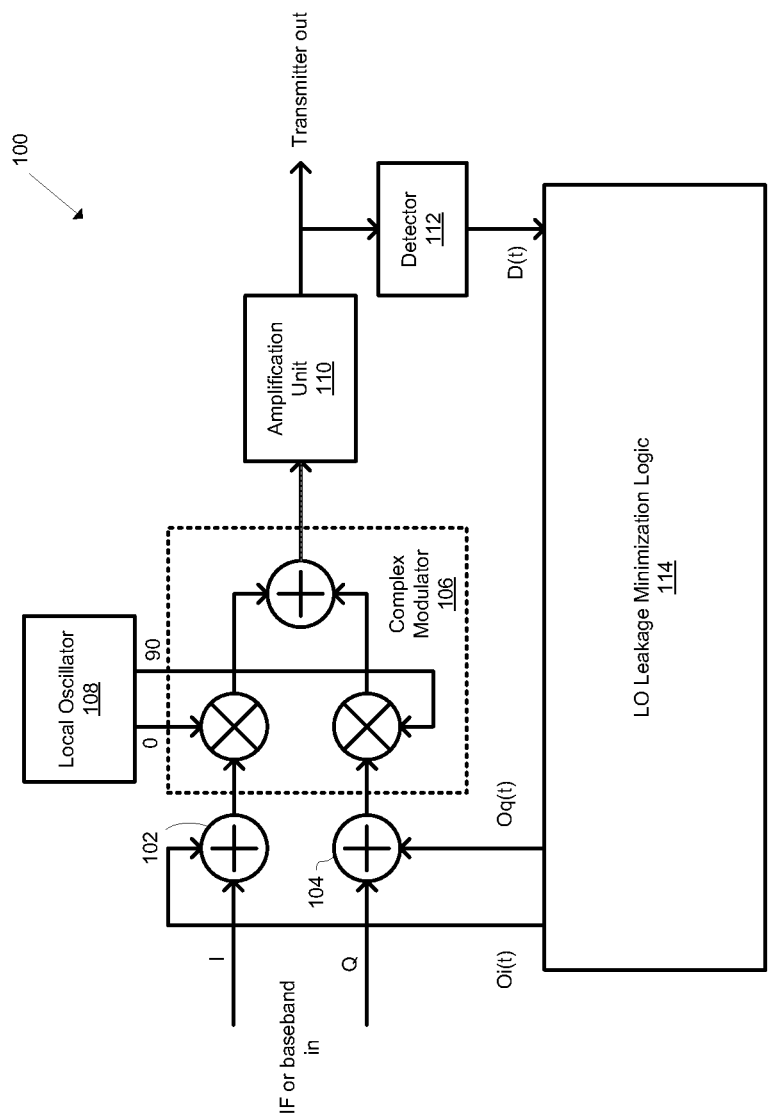
FIG. 1 is a block diagram illustrating an example transmitter system architecture, according to an embodiment.

FIG. 1 is a block diagram illustrating an example system architecture, according to an embodiment. System architecture 100 generally comprises adder 102, adder 104, complex modulator 106, local oscillator 108, amplification unit 110, detector 112, and LO leakage minimization logic 114.

Referring to FIG. 1, adders 102 and 104 of the transmitter system architecture 100 receives a target signal. The target signal is an electronic signal carrying information for transmission by the transmitter system. For example, the target signal may be an audio signal, video signal, or other data signal. When received by adders 102 and 104, the target signal may be at baseband or at an intermediate frequency (IF). The target signal is decomposed into its quadrature-carrier (IQ) form, where I represents an in-phase component (or real part) of the input signal and Q represents a quadrature component (or imaginary part) of the same signal. Thus, I and Q are orthogonal to each other and represent a decomposition of the signal into complex vector space. Adders 102 and 104 are configured for combining, respectively, I and Q of the IF or baseband target signal with offsets Oi(t) and Oq(t), respectively. Oi(t) represents an in-phase component of a composite offset signal, and Oq(t) represents a quadrature component of the same composite offset signal. Thus, Oi(t) and Oq(t) are orthogonal to each other and represent a decomposition of the composite offset signal into complex vector space. The offset signal acts as a cancellation vector that is added to reduce or eliminate noise introduced by leaking energy from local oscillator 108. The offsets Oi(t) and Oq(t) are automatically and dynamically adjusted by minimization logic 114 according to techniques described further below. In an embodiment, each of Oi(t) and Oq(t) is an adjustable DC offset.

Complex modulator (or mixer) 106 modulates frequency from local oscillator 108 with complex IF or baseband from I and Q. Specifically, complex modulator 106 uses local oscillator 108 as a frequency reference for converting complex baseband or IF to a transmit frequency, such as a radio frequency (RF). The frequency references used to convert the quadrature component of the target signal is 90 degrees out of phase with the reference used to convert the in-phase component.

Amplification unit 110 comprises one or more variable, fixed gain and/or other power amplifiers for increasing the power of the signal after it has been converted to a transmit frequency. For instance, amplification unit 110 may include an RF power amplifier to increase the power of the target signal and increase the range of the corresponding radio waves that are transmitted. Once amplified, the RF signal may be applied to an antenna (not illustrated) to generate radio waves for transmitting the target information to a receiver.

Detector 112 measures the electrical power or voltage of transmitter output from power amplification unit 110 and generates power information that indicates the measured power and/or voltage of the output (i.e., the RF signal after amplification). Detector 112 provides the power information D(t) to minimization logic 114. Minimization logic 114 uses the power information to adjust the offset signals Oi(t) and Oq(t) to minimize the LO leakage form local oscillator 108. Accordingly, the corresponding cancellation vector can be automatically and dynamically adjusted to address shifting LO leakage caused by varying conditions.

Transmitter system architecture 100 may include other components that are not illustrated for purposes of brevity. For example, if the transmitter is a superheterodyne transmitter, then the transmitter may include a second modulator and a second local oscillator (not illustrated) for converting the target signal to an intermediate frequency before the target signal is input to adders 102 and 104. Transmitter system architecture 100 may be implemented in any device that communicates via a transmitter. Examples include, without limitation, cellular telephones, monitoring devices, Bluetooth, Zigbee, WiFi, WiMax, and other wireless communication devices.

Adjustable Offsets Based on Power Information

According to an embodiment, the offsets Oi(t) and Oq(t) are adjusted based on the detected power information D(t). Carrier leakage from LO 108 is amplified by amplification unit 110 if it is not cancelled out by the offset Oi(t) and Oq(t) and causes an increase in the output power of the RF signal. Therefore, the offset signal is adjusted and set in a manner that minimizes the transmitter output power detected by detector 112. By adjusting the offset in such a manner, LO leakage can be dramatically reduced and cancelled.

Figure 2:
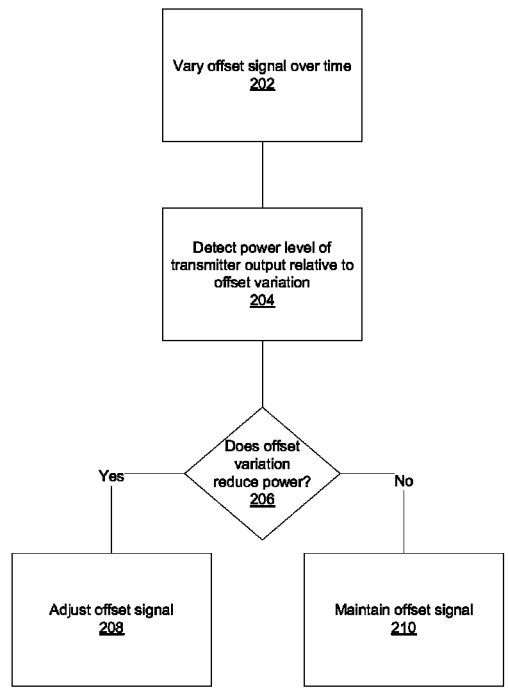
FIG. 2 is a flowchart illustrating an example process for adjusting an offset signal based on transmitter output power, according to an embodiment.

FIG. 2 is a flowchart illustrating an example process for adjusting an offset signal based on transmitter output power, according to an embodiment. In step 202, minimization logic 114 varies the offset signal over time. In an embodiment, the minimization logic 114 varies the offset signal according to a dithering function. Example dithering functions and offset signal variations are described in more detail below. The number, range, and type of variations that are performed may vary from implementation to implementation.

In step 204, minimization logic 114 detects the power level of the transmitter output relative to the offset variation. For instance, minimization logic 114 detects, from the power information provided by detector 112, the effect that a particular variation has on the total transmitter output power (i.e., whether the particular variation increases or decrease total transmitter output power).

In step 206, if the power information indicates that the total transmitter power is reduced, then the process continues to step 208, and the offset signal is adjusted. If the offset variation does not reduce power, then the process continues to step 210, and the current offset signal is maintained. If multiple offset variations or a continuous range of offset variations are being analyzed, then the offset is adjusted at step 208 based on the particular variation that reduces the power output by the greatest amount.

In other embodiments, the process may transition from step 206 to step 208 if an offset variation results in the same total transmitter power or if the offset variation increases power less than a threshold amount. For instance, minimization logic 114 may adjust current offset O1 to offset O2, even though O2 slightly increases the power output. By allowing an adjustment in such a situation, minimization logic 114 may avoid false bottoms (i.e., local minimums) in the output power and reach the absolute lowest power output (i.e., the global minimum). Another technique for avoiding local minimums is adjusting the dither amplitude (i.e., the amount of variation permitted), as described further below. Power averaging and other statistical analyses may also be used to find the global minimum, depending on the particular implementation.

Figure 3A:
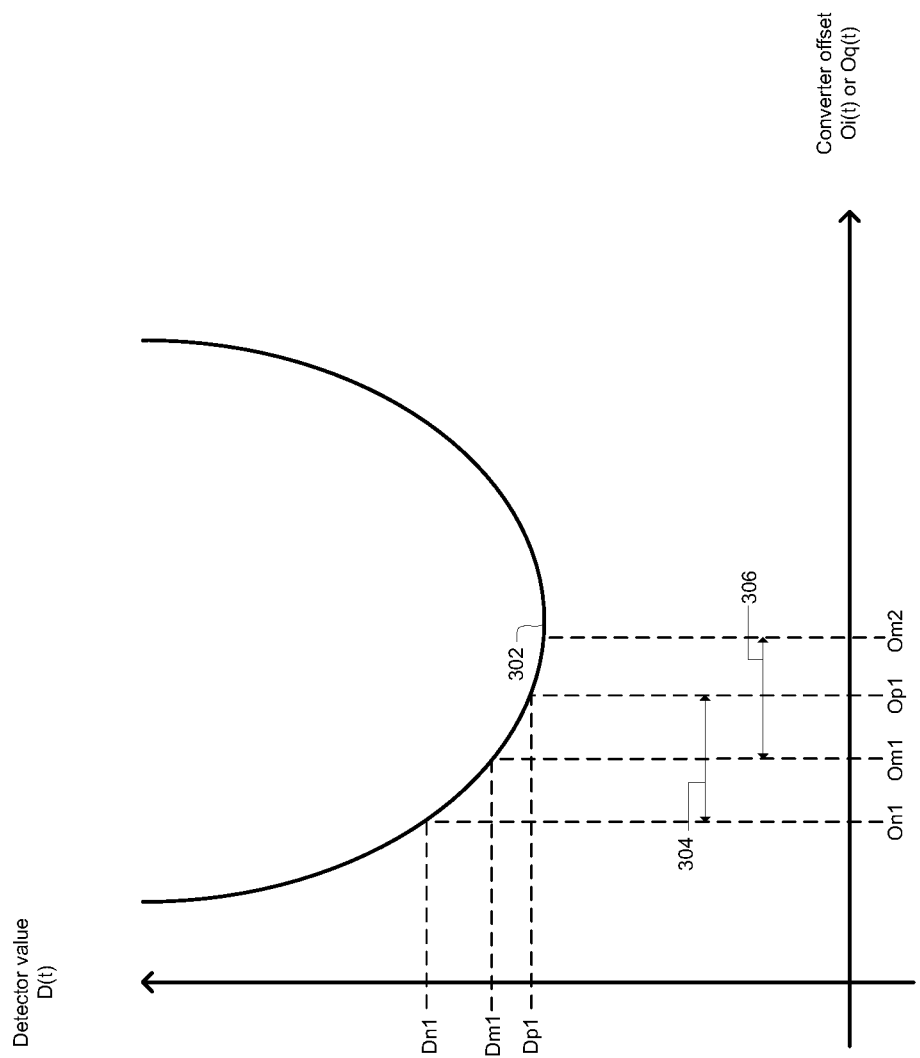
FIGS. 3A and 3B are graphs illustrating offset adjustments based on power information, according to an embodiment.
Figure 3B:
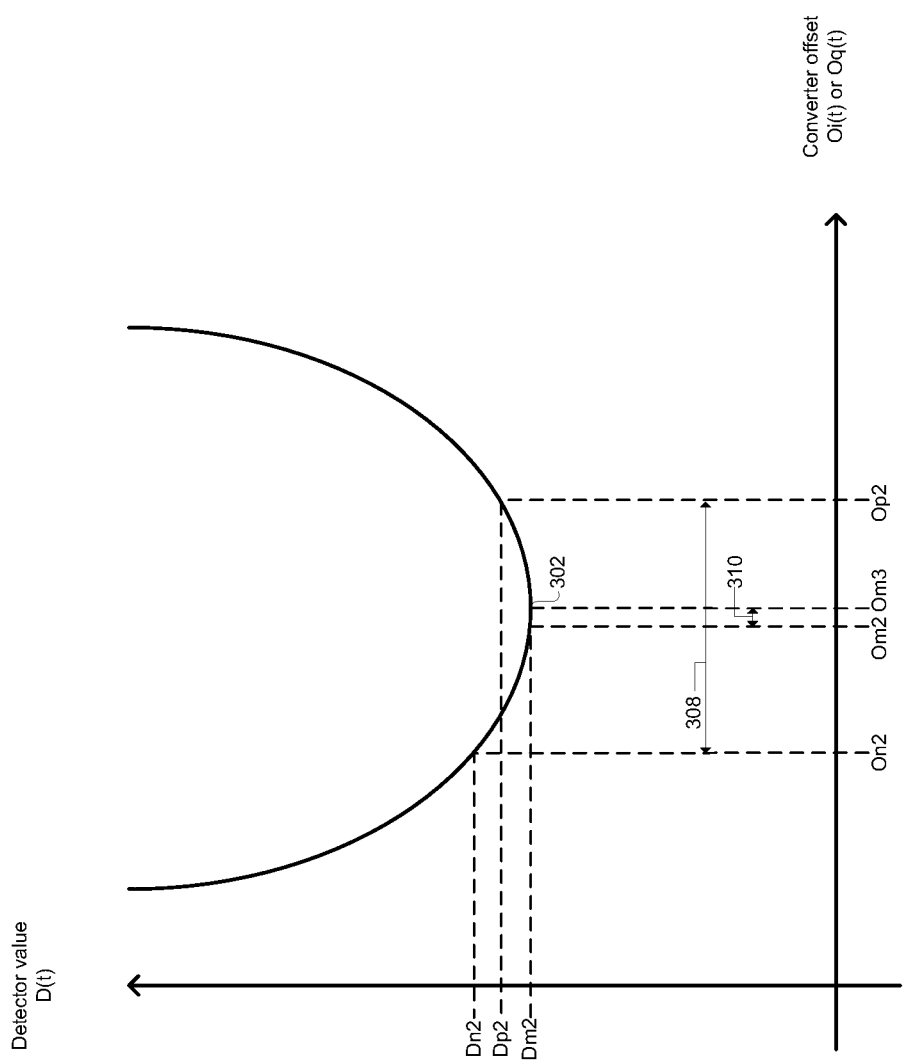

FIGS. 3A and 3B are graphs illustrating offset adjustments based on power information, according to an embodiment. In both FIGS. 3A and 3B, the y-axis, D(t), represents power information that is output by detector 112 based on its power and/or voltage measurements. The x-axis represents the respective converter offset signal Oi(t) or Oq(t) at the corresponding power level. In FIG. 3A, Om1 represents the current offset signal, and Op1 and On1 represent the peak offset variations. Point 302 represents the minimum power level of the RF signal output by amplification unit 110 and the point at which all LO leakage is cancelled. Minimization logic 114 automatically adjusts the offset based on the power information feedback provided by detector 112 to adjust the current offset toward point 302.

In an example embodiment, offset signal Oi(t) is initially set at point Om1 as illustrated in FIG. 3A. The corresponding power level, Dm1, is significantly greater than the minimum power level at point 302. Minimization logic 114 detects that Dm1 is not the minimum power level by varying the offset signal between points On1 and Op1. Thus, current offset Om1 acts as a mid-level or center for the offset variations. Minimization logic 114 determines that the transmitter power output increases as the offset is adjusted in the direction of On1 and decreases as the offset is adjusted in the direction of Op1. Accordingly, minimization logic 114 adjusts the signal in the direction of Op1, and Om2 becomes the new offset center.

This process may be repeated continuously or periodically as the transmitter is operating. For example, in FIG. 3B, offset Om2 is adjusted to Om3, which corresponds to the minimum power level. Even if the offset signal is adjusted to point 302, the minimum point may shift over time due to varying circumstances such as changing frequency, temperature, gain, and power levels within the transmitter chain. Therefore, even after this minimum power level is reached, the LO leakage minimization process is continued according to an embodiment. By continually running the minimization process, the cancellation vector can be automatically and dynamically adjusted to address such variations in the LO leakage.

Controlling the Step Size of Offset Adjustments

Large adjustments to the offset signals Oi(t) and Oq(t) may negatively impact the stability of transmitter communications as it may increase the residual LO leakage level and cause spikes in the output power level. In order to provide stability in such situations, minimization logic 114 controls the step size of the adjustments to offsets Oi(t) and Oq(t), according to an embodiment.

Referring again to FIG. 3A, distance 306 between the current offset Om1 and the new offset Om2 is the step size of the adjustment. A maximum step size may be set to help ensure stability of the transmission system. A low step size allows for very low offset modulation thereby minimizing the residual LO leakage caused by the modulation. A high step size allows the control loops to reach a minimum LO leakage level (i.e. point 302) more quickly, but results in a higher residual LO leakage level. In an embodiment, the step size determines the distance of each adjustment that is made by minimization logic 114.

In another embodiment, the step size is dynamically adjusted based on a state of the minimization system. For example, minimization logic 114 may analyze the power feedback information provided by detector 112 and adjust the step size in a manner that most efficiently reaches the bottom without surpassing the maximum step size. The manner in which the step size is adjusted may vary from implementation to implementation. Referring to FIG. 3B, the step size is reduced from distance 306 to distance 310 as the offset center approaches point 302. In another example embodiment, minimization logic 114 may maintain the step size at distance 306, and overstep point 302. In response to determining that the minimum point was passed, minimization logic 114 may reduce the step size as it returns toward point 302. Other techniques and system state information may be factored in when adjusting the step size, depending on the particular implementation. Examples techniques include, without limitation, power averaging and other statistical modeling for setting the step size. Other state information that may be factored in includes, without limitation, the current dither amplitude and the amount of power variation caused by the dithering.

Controlling the Dither Amplitude of Offset Variations

Large variations of the offset signals Oi(t) and Oq(t) may negatively impact the stability of transmitter communications for the same reasons making too large an adjustment may impact performance. In order to provide stability in such situations, minimization logic 114 controls the dither of variations to offsets Oi(t) and Oq(t), according to an embodiment. The dither amplitude corresponds to the amount or scale of the variations that are applied to the offset signal.

For example, distance 304 illustrated in FIG. 3A represents the dither amplitude relative to current offset Om1. Op1 and Op2 represent the positive and negative peaks in the offset variations. In an embodiment, minimization logic 114 sets a maximum dither amplitude to limit the amount of offset variation provided. A higher dither amplitude allows for a more complete analysis of D(t) and may help avoid local minimums, but increases the residual noise from large power variations. A lower dither amplitude minimizes the large power variations, but reduces the amount of power information collected relative to the current offset.

In an embodiment, the dither amplitude is dynamically adjusted based on the power information D(t). As the slope of the power curve decreases, the negative impact of having a high dither amplitude also decreases. Accordingly, minimization logic 114 automatically increases the dither amplitude in such a situation, and decreases the dither amplitude when the slope of the power curve surrounding the offset signal increases. For instance, dither amplitude in FIGS. 3A and 3B is increased from distance 304 to distance 308 as the slope surrounding the current offset, Om2, decreases in relation to the previous offset, Om1. Thus, as the curve flattens out, the dither amplitude is increased, which helps detect the global minimum and prevent stabilization on a local minimum. In order to detect the slope of the power curve, minimization logic 114 analyzes the relationship between the total transmitter output power and the peak variations in the power. For example, minimization logic 114 may adjust distance 304 based on peak power measurements Dn1 and Dp1 relative to total power Dm1. Similarly, minimization logic 114 may adjust distance 308 based on peak power measurements Dn2 and Dp2 relative to total power Dm2. Example techniques for calculating the step size and dither amplitude are described in further detail below.

Calculating the Offset Signal

As described above, an offset signal is automatically and dynamically adjusted based on feedback from detected changes in the output power. FIG. 4 is a chart illustrating example equation sets that may be used for calculating and adjusting an offset signal during a process for minimizing LO leakage in a transmitter, according to an embodiment.

Oi(t) and Oq(t) may be calculated (or approximated) in accordance with equations below and the equations listed in equation set 402:

$$Oi(t)=\text{clip}(mi(t)+\text{clip}(Ka*\int mfi(t)*D(t)dt, O\max-mi(t), O\min+mi(t)), O\max, O\min); \text{ and} \quad (1)$$

$$Oq(t)=\text{clip}(mq(t)+\text{clip}(Ka*\int mfq(t)*D(t)dt, O\max-mq(t), O\min+mq(t)), O\max, O\min). \quad (2)$$

In equation sets 402 and 404, "clip" is a clipping function according to the format clip (a, b, c) where a=value to clip, b=max value, and c=minimum value. Thus, in equations (1) and (2), Omax and Omin serve as the max and min value, respectively, in the outer clipping function, and Omax−mi(t) (or mq(t)) and Omin+mi(t) (or mq(t)) serve as the max and min value, respectively for the inner clipping function. The clipping functions ensure that the integrated value does not exceed a desired range and help provide stability while the transmitter is operating. Accordingly, Omax represents a desired maximum offset and Omin represents a desired minimum offset. However, the clipping functions may be omitted when calculating the offsets, as illustrated in equation set 404.

The functions mi(t) and mq(t) are modulated signals that are generated by multiplying a modulation gain term G(t) by the modulation function mfi(t) and mfq(t), respectively, as represented by the following equations:

$$mi(t)=G(t)*mfi(t); \text{ and} \quad (3)$$

$$mq(t)=G(t)*mfq(t). \quad (4)$$

The modulation gain term G(t) is defined further below.

Ka is the desired convergence rate for Oi(t) and Oq(t). A low convergence rate will allow for very low offset modulation thereby minimizing the residual LO leakage caused by the modulation. A high convergence rate will allow the control loops to reach a minimum LO leakage level more quickly with a higher residual LO leakage level. In other words, different Ka values adjust the step size of the offset variations. Ka may be adjusted dynamically based on the system state. For example, the convergence rate may initially be set at a high level and then reduced as the calculated offsets begin to stabilize. Alternatively, Ka may be a fixed value.

D(t) is the power measurement signal generated by detector 112 and is demodulated by multiplying mfi(t) or mfq(t) by D(t) and then integrating over time to provide the offset functions Oi(t) and Oq(t), as illustrated in the equations (1) and (2) above.

The modulation gain term G(t) may be calculated in accordance with the following equation: (5) G(t)=clip(Kd*∫(Ks−R(t))dt, Gmax, Gmin) where Kd is a desired convergence rate for G(t), Ks is a desired set point for offset modulation to total transmitter level ratio, Gmin is a desired minimum modulation gain, and Gmax is a desired maximum modulation gain.

R(t) provides a measure of the resulting offset modulation mi(t) and mq(t) relative to the total transmitter power level and may be calculated according to the following equation: (6)

$$R(t) = \frac{|Dpi - Dmi| + |Dpi - Dmi| + |Dnq - Dmq| + |Dpq - Dmq|}{Dmi + Dmq},$$

where the values of Dni, Dmi, Dpi, Dnq, Dmq, and Dpq are measured while mfi(t) and mfq(t) are varied over time. Dni is the detector value D(t) for offset mfi(t) at a minimum value; Dmi is the detector value D(t) for offset mfi(t) at mid value; Dpi is the detector value D(t) for offset mfi(t) at a maximum value; Dnq is the detector value D(t) for offset mfq(t) at a minimum value; Dmq is the detector value D(t) for offset mfq(t) at mid value; Dpq is the detector value D(t) for offset mfq(t) at a maximum value. R(t) is compared to Ks (the desired ratio) resulting in an error signal used to adjust mi(t) and mq(t), as indicated in equations (3)-(5).

The functions mfi(t) and mfq(t) are dithering functions that do not interfere with each other (i.e., are orthogonal to each other). Examples functions include, without limitation (7) mfi(t)=sin(w*t) and mfq(t)=cos(w*t); and (8) mfi(t)=+1,−1, 0,0,0 and mfq(t)=0,0,0,+1,−1. Note that equation (7) may be used for continuous time analysis and equation (8) may be used in a discrete time analysis. Other dithering functions may be used, depending on the particular implementation.

Equation set 402 is merely one example of a set of calculations that may be performed to implement the processes and techniques described above. Equation set 404 is another example that is similar to equation set 402, albeit the outer clipping function of equations (1) and (2) is omitted. Other equation sets and/or calculations may also be used and may vary from implementation to implementation.

Example LO Minimization Logic Architecture

Figure 5:
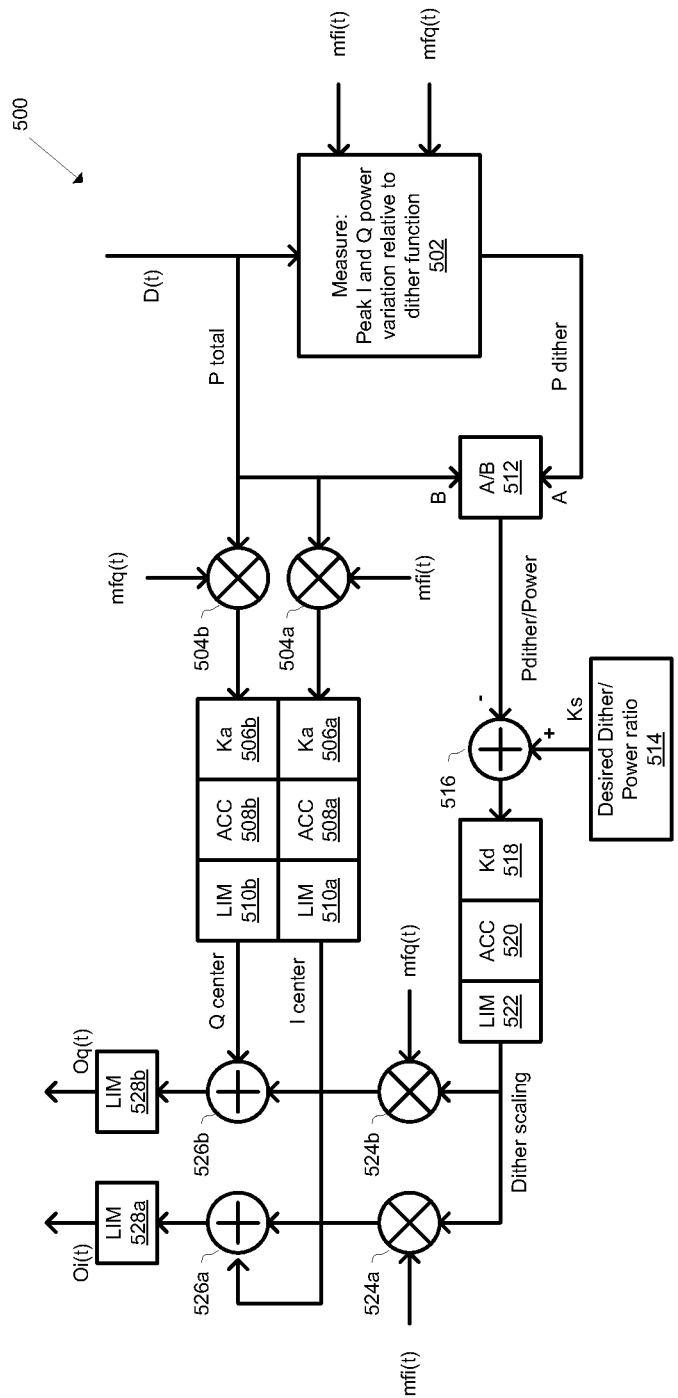
FIG. 5 is a block diagram illustrating an example architecture for implementing an LO leakage minimization process, according to an embodiment.

FIG. 5 is a block diagram illustrating an example architecture for implementing an LO leakage minimization process, according to an embodiment. This architecture may be used to implement LO leakage minimization logic 114 according to equation set 402. However, the architecture may vary depending on the particular implementation. For example, if equation set 404 were implemented, LIM blocks 528a and 528b may be omitted. Other architectures may also be used, depending on the particular implementation. The architecture illustrated in FIG. 5 may be implemented in hardware, software, or a combination thereof.

Architecture 500 receives power information signal D(t) from detector 112. D(t) is a function representing the total transmitter power level as a function of time. Detector 112 acquires this information by measuring the power or voltage output of amplification unit 110. The total transmitter power (P total) is fed to blocks 502, 504a, 504b, and 512. Block 502 comprises logic for measuring the peak inphase and quadrature power variations relative to the corresponding dither functions mfi(t) and mfq(t). The logic extracts the values of Dni, Dmi, Dpi, Dnq, Dmq, and Dpq from D(t). The logic of block 502 may be used to calculate the numerator of equation (6) above. The resulting value, P dither, is then sent to block 512, which is described in further detail below.

Blocks 504a and 504b are mixers that mix mfi(t) with D(t) and mfq(t) with D(t) respectively to approximate the mfi(t)*D(t) of equation (1) and mfq(t)*D(t) of equation (2). Thus, this block demodulates D(t) with respect to the dithering function, which generates an error signal for adjusting the offset signal. The error signal indicates the direction in which the offset signal should be adjusted and is used by blocks 506, 508, and 510 to adjust the offset. Blocks 506a and 506b represent Ka, which is the desired Oi(t) and Oq(t) convergence rate. These blocks control the step size of the adjustment that is made based on the error signal. Blocks 508a and 508b are accumulators that perform the integration functions and blocks 510a and 510b perform the inner clipping functions illustrated in equations (1) and (2). In summary, blocks 504a-510a approximate the calculations clip (Ka*∫mfi(t)*D(t) dt, Omax−mi(t), Omin+mi(t)) of equation (1) and blocks 504b-510b approximate the calculations for clip (Ka*∫mfq(t)*D(t)dt, Omax−mq(t), Omin+mq(t)). The result is I center and Q center, which respectively represent the inphase component and the quadrature component of the current offset signal.

Block 512 comprises logic for computing the ratio or other relationship information between the total output power, P total, and the variation in power, P dither, caused by the dithering. A large ratio means that the power variation is large, and a small ratio means that the power variation is small. The output of block 512 is the ratio P dither/P total, which corresponds to R(t) in equation set 402. This output is fed into block 516, which is an adder that subtracts R(t) from Ks. Block 514 sets the desired dither to power ratio, Ks, which is provided to block 516. Block 516 generates an error signal based on the comparison that adjusts the amount of dithering applied to the offset signal. A greater amount of dithering corresponds to a greater amount of variation to the current offset signal. As the power variation decreases, the dithering factor increases. In other words, as the slope of the power curve decreases, the step size between the current offset and the variations is increased.

Block 518 is a gain constant, Kd, corresponding to the desired convergence rate for G(t). Block 520 is an accumulator that performs the integration function and block 522 is a limiter that performs the clipping function of equation (5). The output of these blocks is a dither scaling factor that controls the amount of dithering (i.e., the dither amplitude) applied to the offset signals I center and Q center. Blocks 524a and 524b are mixers that apply the dither scaling to the dither functions mfi(t), and mfq(t), respectively. Blocks 526a and 526b are adders that add the output of blocks 524a and 524b to the current offsets, I center and Q center. Blocks 526a and 526b are limit functions that apply the outer clipping function of equations (1) and (2), respectively.

Hardware Overview for Implementing LO Leakage Minimization Process

According to one embodiment, the techniques described herein for minimizing LO leakage are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
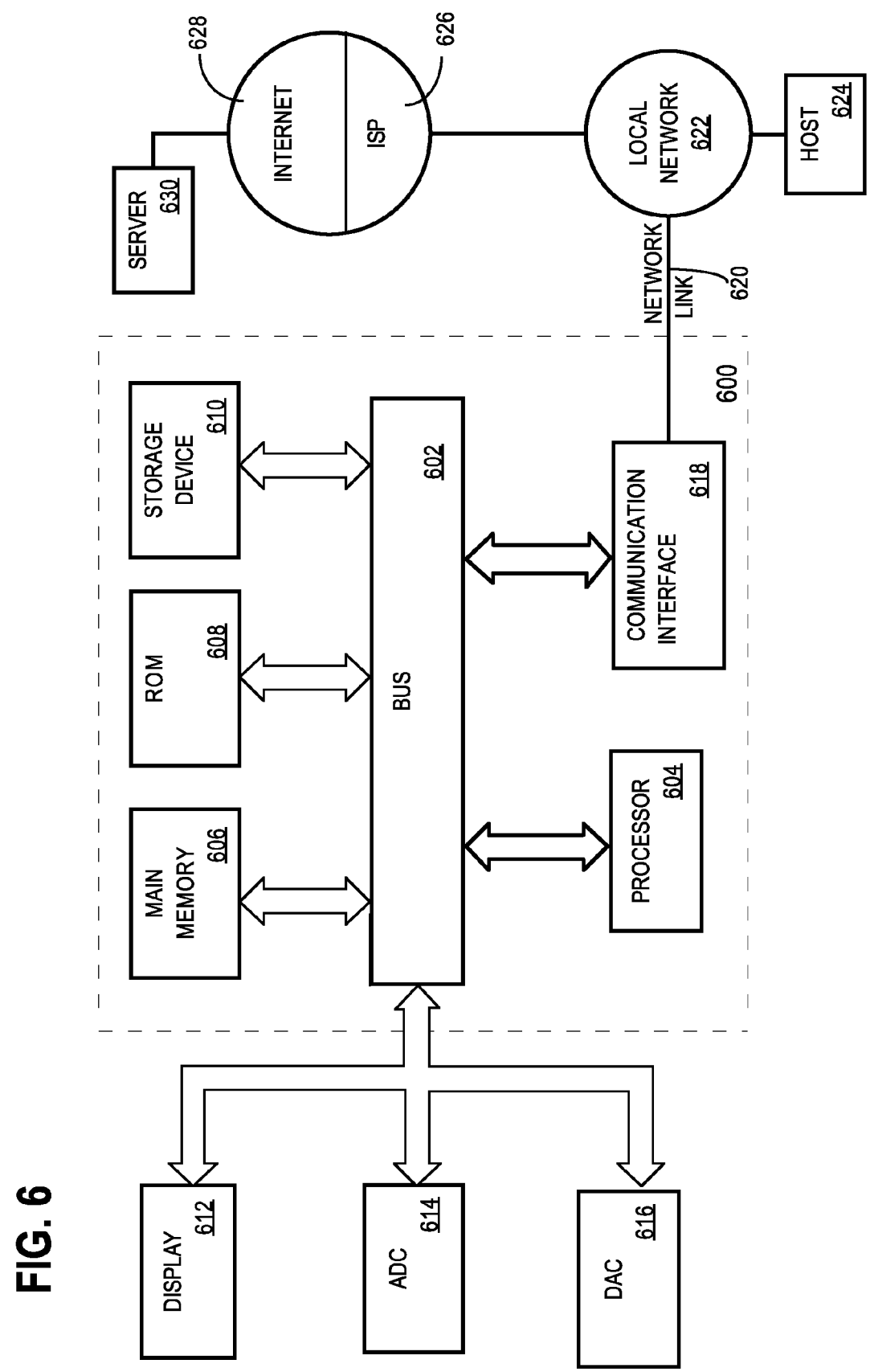
FIG. 6 is a block diagram depicting a computer system upon which an embodiment may be implemented.

For example, FIG. 6 is a block diagram that illustrates a computer system 600 upon which an embodiment of the LO leakage minimization process may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An analog to digital converter (ADC) 616 is configured to convert the measured power of the RF signal and convert the measurements into a digital format that may be processed by computer system 600. A digital to analog converter (616) converts digital representations of offset signals Oi(t) and Oq(t), as received from computer system 600, to analog signals for application to the target signal.

Computer system 600 may implement the leakage minimization techniques, such as the offset calculations described above, using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for reducing local oscillator leakage in a transmitter, the method comprising:
   receiving a target signal for transmission by the transmitter;
   applying an offset to the target signal;
   after applying the offset, converting the target signal to a transmission signal using the local oscillator;
   determining a power associated with the transmission signal;
   varying the offset over time in accordance with a dither function;
   in response to varying the offset over time, detecting that a particular variation reduces the power associated with the transmission signal;
   adjusting the offset based on the particular variation.

2. The method of claim 1, wherein adjusting the offset comprises adjusting the offset in a manner that minimizes the power associated with the transmission signal.

3. The method of claim 1, further comprising:
   adjusting a dither amplitude based on a variation in power of the transmission signal caused by said varying of the offset.

4. The method of claim 3, further comprising: setting a maximum dither amplitude that limits an amount of variation to the offset over a period of time.

5. The method of claim 1, further comprising adjusting the offset in steps by an amount determined by a particular step size;
   wherein the particular step size is adjusted based on the power associated with the transmission signal.

6. The method of claim 1, further comprising setting a maximum step rate that limits an amount of adjustment to the offset at a particular time.

7. The method of claim 1, wherein applying the offset comprises:
   applying an inphase component of the offset to an inphase component of the target signal;
   applying a quadrature component of the offset to a quadrature component of the target signal;
   wherein adjusting the offset to the target signal comprises adjusting at least one of the inphase component of the offset and the quadrature component of the offset.

8. The method of claim 7, wherein varying the offset over time in accordance with the dither function comprises:
   varying the inphase component of the offset according to a first dithering function;
   varying the quadrature component of the offset according to a second dithering function;
   wherein the first dithering function and the second dithering function are orthogonal;
   detecting power variations of the transmission signal in response to varying the inphase component and the quadrature component.

9. The method of claim 1, wherein the target signal is at least one of a baseband signal or an intermediate frequency (IF) signal, and wherein the transmission signal is a radio frequency (RF) signal.

10. A transmitter comprising:
    an adder for applying an offset to a target signal for transmission;
    a local oscillator (LO) for converting the target signal to a transmission signal after the adder applies the offset;
    a detector for detecting a power associated receiving a target signal for transmission by the transmitter;
    LO leakage minimization logic for:
      varying the offset over time in accordance with a dither function;
      in response to varying the offset over time, detecting that a particular variation reduces the power associated with the transmission signal; and
      adjusting the offset based on the particular variation.

11. The transmitter of claim 10, wherein the LO leakage minimization logic adjusts the offset in a manner that minimizes the power associated with the transmission signal.

12. The transmitter of claim 10, wherein the LO leakage minimization logic adjusts a dither amplitude based on a variation in power of the transmission signal caused by said varying of the offset.

13. The transmitter of claim 12, wherein the LO leakage minimization logic sets a maximum dither amplitude that limits an amount of variation to the offset over a period of time.

14. The transmitter of claim 10, the LO leakage minimization logic adjusts the offset by performing operations comprising:
    adjusting the offset in steps by an amount determined by a particular step size,
    wherein the LO leakage minimization logic further adjusts the particular step size based on the power associated with the transmission signal.

15. The transmitter of claim 10, wherein the LO leakage minimization logic sets a maximum step rate that limits an amount of adjustment to the offset at a particular time.

16. The transmitter claim 10, wherein the adder comprises a first adder component and a second adder component and applying the offset comprises:
    applying, using the first adder component, an inphase component of the offset to an inphase component of the target signal;
    applying, using the second adder component, a quadrature component of the offset to a quadrature component of the target signal;
    wherein the LO leakage minimization logic adjusts the offset by performing operations comprising adjusting at least one of the inphase component of the offset and the quadrature component of the offset.

17. The transmitter of claim 10, further comprising:
    an amplifier for amplifying the transmission signal, wherein the detector detects the power of the transmission signal after the amplifier amplifies the transmission signal.

18. The transmitter of claim 10, wherein the target signal is at least one of a baseband signal or an intermediate frequency (IF) signal, and wherein the transmission signal is a radio frequency (RF) signal.

* * * * *